2,832,731

PREPARATION OF ALKALI METAL-TITANIUM FLUORIDES

George L. Cunningham, Cleveland Heights, Ohio, assignor, by mesne assignments, to Horizons Titanium Corporation, Princeton, N. J., a corporation of New Jersey No Drawing. Application December 15, 1955
Serial No. 553,193

8 Claims. (Cl. 204—64)

This invention relates to a process for preparing alkali metal double fluorides of titanium, particularly sodium-titanium fluoride, potassium-titanium fluoride and lithium-titanium fluoride in pure form or admixed with alkali metal chlorides. More particularly, it relates to a process for preparing such double fluorides or mixtures without recourse to the use of hydrogen fluoride and in a direct, efficient and economical manner.

The alkali metal fluorides of titanium have recently assumed an increasing importance as sources from which titanium may be obtained by a fused salt electrolysis as described in pages 332 to 340 of the Journal of the Electrochemical Society, vol. 102, No. 6, June 1955. A number of processes are known for preparation of the alkali metal double fluorides of titanium. Typical processes are described in United States Patent No. 2,653,855, which involves a fusion of the reactants and in United States Patents Nos. 2,568,341, and 2,500,792, which involve the use of hydrogen fluoride itself. Such processes require elaborate apparatus and extreme caution, in order to avoid the hazards which may result from evolved fluorine or hydrogen fluoride.

In a more recent United States Patent No. 2,722,510, there is described a method for producing a double fluoride of an alkali metal and titanium in which many of the objectionable features inherent in prior art processes are avoided. In accordance with the disclosure in this patent, titanium tetrachloride is solidified at temperatures below minus 30° C. and the solid is added to an aqueous solution of an alkali metal fluoride or of a mixture of an alkali metal fluoride and an alkali metal chloride. By freezing the $TiCl_4$ prior to reacting it with the alkali metal fluoride, the loss of the titanium, due to the formation of volatile compounds of the metal or to substantial hydrolysis of the tetrachloride with consequent formation of the hydroxide is avoided entirely or at least minimized to a considerable extent. According to the patentee, the same reaction may be made to take place without resorting to the freezing step, but it is stated that "when the reaction is so carried out, the volatile and hydrolyzable character of the $TiCl_4$ cause such loss of this material by volatilization and/or decomposition that it is uneconomical as well as being highly objectionable from the point of view of any persons in the vicinity." The disadvantages of operating with materials at and below minus 30° C. are readily apparent in the special equipment and techniques required.

I have found that the advantages described in Patent 2,722,510 may be realized by suitably modifying the process so as to avoid operating at temperatures appreciably below 0° C. without incurring any of the disadvantages inherent in the prior art. This is accomplished, in accordance with my invention by preparing aqueous solutions of titanium tetrachloride by bringing together ice and either liquid titanium tetrachloride or liquid mixtures of titanium tetrachloride and certain chlorinated hydrocarbons in which the titanium tetrachloride is soluble. Thus my process does not require the freezing of the tetrachloride with the consequent handling of materials at or below minus 30° C.

When liquid titanium tetrachloride is added to water at room temperature, a violent reaction is observed in which hydrogen chloride is evolved, produced apparently as one of the hydrolysis products. I have found that when liquid titanium tetrachloride is added to ice, the violence of the reaction is greatly decreased and little or no hydrolysis occurs. I have further found that the mild reaction attending the addition of the tetrachloride to ice is further moderated by adding the liquid tetrachloride as a solution in which it is dissolved in a suitable non-aqueous liquid. By this expedient, the hydrolysis of the tetrachloride is further decreased and the recovery of the desired fluotitanate is enhanced.

It is preferable to have the ice in the form of relatively small pieces in order to provide the maximum surface/mass ratio for a given mass of ice. Preferably chopped ice, or shavings of ice should be provided for the addition of the liquid tetrachloride.

The liquid titanium tetrachloride should be chilled to temperatures of about 0° C. before it is added to the ice. When the tetrachloride is at a temperature in excess of 10° C. the losses incident to the formation of the aqueous solution appear to increase rapidly with increase in temperature. Cooling the liquid tetrachloride appreciably below 0° C. has not been found to provide benefits commensurate with the expense of providing means for maintaining it at such temperatures. For small laboratory scale experiments, it has only been found necessary to pack a flask of $TiCl_4$ in an ice bath to achieve the desired cooling of the tetrachloride prior to formation of an aqueous solution of same.

Instead of adding chilled titanium tetrachloride to ice, a cold mixture of titanium tetrachloride dissolved in a suitable non-aqueous liquid may be added to the ice. Suitable non-aqueous and "inert" liquids include carbon tetrachloride, trichloroethylene, pentachloroethylene and other chlorinated hydrocarbons which are relatively insoluble in water, but which readily dissolve $TiCl_4$. In general, it has been found that the more dilute the non-aqueous-tetrachloride solution, the more the reaction is moderated. With carbon tetrachloride, mixtures of from 5%–95% $TiCl_4$ may be employed. Very dilute mixtures (e. g. 5% $TiCl_4$) require the use of large amounts of the carbon tetrachloride, or other inert non-aqueous liquid, which must be recovered to render the process economically attractive. I have found that a proportion of titanium tetrachloride to carbon tetrachloride of 1:3 by weight to be most satisfactory.

When cold liquid titanium tetrachloride is added to a mass of chopped ice, the titanium tetrachloride slowly dissolves in the water which is formed from the melting ice. When solution has been effected, the ratio of chloride to titanium ions is substantially four, showing that virtually no hydrolysis has occurred during the solution process.

In similar fashion, when a cold solution of titanium tetrachloride and carbon tetrachloride is slowly added to a mass of chopped ice, the titanium tetrachloride in the solution slowly dissolves in the water which is formed from the melting ice and is thereby extracted from the original non-aqueous solution. After standing for a short time two distinct liquid layers are formed. One, an aqueous layer consists essentially of titanium tetrachloride dissolved in water and a trace of carbon tetrachloride. The other, a non-aqueous layer of carbon tetrachloride, contains traces of water and titanium tetrachloride. The two layers are readily separated by conventional techniques such as decantation. The layer of carbon tetrachloride, after being separately recovered, is employed as a solvent for additional titanium tetrachloride which it is desired to dissolve in water, in a repetition of the process. The aqueous solution of titanium tetrachloride, constituting the aqueous layer is employed as one of the raw materials reacted to produce either the desired alkali metal fluotitanate, or if desired, a mixture of alkali metal fluotitanate and additional alkali metal halide such as alkali metal chloride.

In addition to the aqueous solution of titanium tetrachloride, prepared as above described, the other materials entering the reaction to produce the alkali metal fluotitanate are one or more alkali metal fluorides and if the mixture of the fluotitanate and an alkali metal chloride is to be prepared, then alkali chloride is also required. These alkali metal halides may either be in the form of aqueous solutions, or as solids.

As disclosed in the aforementioned Patent 2,722,510, the amount of water used in making up the aqueous solution of titanium tetrachloride should be no more than enough to dissolve and keep in solution all of the alkali metal chlorides and/or alkali metal fluorides present at the end of the process, if the pure alkali metal fluotitanate is to be recovered and no more than enough to dissolve the titanium tetrachloride when making the mixture of an alkali metal fluotitanate and alkali metal chloride. When it is desired to recover the alkali metal fluotitanate, per se, an aqueous solution is formed of the aqueous solution of the tetrachloride and the required alkali metal fluoride. Because they are only slightly soluble, the desired alkali metal fluotitanates are readily recovered as precipitated solids. To minify the loss of alkali metal fluotitanates, the solution remaining may be cooled, whereby additional quantities precipitate or it may be evaporated and then cooled to the same result. The recovered fluotitanate is washed once with a small amount of hot water, preferably containing about 0.5% by weight of KF. All of the recovered liquids are combined and may be retained for reuse in the process as the liquid in which additional alkali metal halides are dissolved for reaction with further amounts of $TiCl_4$. The crystals of alkali metal fluotitanate are dewatered in a centrifuge and then dried. The liquor from the first centrifuging is retained to be added to the liquor from which the first batch of crystals is obtained. To purify the fluotitanate the crystals may be dissolved in a minimal amount of hot water and recrystallized therefrom on cooling.

When the desired product is a mixture of alkali metal fluotitanate and alkali metal chloride, such as would be suitable for electrolysis to recover metallic titanium, the procedure is substantially similar except that the aqueous solution is evaporated to dryness without any separation of the fluotitanate. In this modification, the evaporation is effected at about 125–150° C. in order to remove any water of hydration.

In one well known type of electrolytic cell for the production of metallic titanium the feed is composed of a mixture of potassium titanium fluoride ($K_2TiF_6$) and sodium chloride. The exhausted melt from this cell is composed of a mixture of potassium fluoride and sodium chloride plus a small amount of potassium titanium fluoride. The spent melt from this cell can be added to an aqueous solution of titanium tetrachloride made in accordance with the process of the present invention. As described previously these will react to form a mixture of potassium titanium fluoride and sodium chloride. When this slurry is evaporated to dryness it can be used as a feed for the titanium electrolytic cell. Chlorine gas is also produced as a by-product in this electrolytic cell, and this chlorine can be used for the preparation of titanium tetrachloride by chlorination of a suitable titanium ore or compound in a manner already well known in the art.

The process of the present invention is further illustrated by the following examples:

*Example I*

A mixture was formed by adding 190 grams of titanium tetrachloride (110 cc.) to 570 grams carbon tetrachloride (360 cc.). The resulting solution was cooled to approximately 0° C. The chilled mixture was added dropwise to 675 grams of finely divided ice. The mixture was stirred for one hour and permitted to settle. The mixture had separated into two distinct liquid layers. The bottom layer was carbon tetrachloride containing only a trace of water and of titanium tetrachloride. The top layer was an aqueous solution of titanium tetrachloride, having a chloride ion to titanium ion ratio of about 4.0. The two layers were separated and 5 cc. of concentrated hydrochloric acid was added to the aqueous layer. 116.2 grams of potassium fluoride (KF) and 168 grams of sodium fluoride (NaF) were added to the aqueous solution producing a precipitate of potassium titanium fluoride. The resulting slurry was stirred for two hours and then heated and brought to approximately 250° C. at which temperature the slurry was filtered. Approximately 230.8 grams of potassium titanium fluoride ($K_2TiF_6$) was obtained as the separated solid. This was a yield of 95.9% based on the theoretical yield. The wet cake was washed with water and dried at about 120° C. to give substantially pure potassium titanium fluoride. The filtrate contained approximately 233.8 grams of sodium chloride, 9.80 grams of potassium titanium fluoride and 675 grams of water. The filtrate contains only a relatively small amount of potassium titanium fluoride, and may be discarded. In this experiment, I removed approximately 570 grams of water by evaporation and then filtered the resulting slurry at approximately 80° C. to separate 191 grams of solid sodium chloride. The filtrate was cooled to 25° C. and filtered to recover an additional 8.0 grams of potassium titanium fluoride which had crystallized out. The filtrate can be discarded or it can be added to the ice used in the next cycle, in order to avoid any loss of potassium titanium fluoride.

*Example II*

190 grams of titanium tetrachloride was added to 190 grams of carbon tetrachloride and the solution was cooled to approximately 0° C. This solution was slowly added to 560 grams of chopped ice. The mixture was stirred for one hour and permitted to settle. The mixture had separated into two distinct liquid layers. The two liquid layers were separated and 5 cc. of concentrated HCl were added to the aqueous layer. A mixture consisting of 116.2 grams of KF and 168 grams of NaF was added to the aqueous solution. The resulting slurry was stirred for two hours after which it was evaporated to dryness and then further dried by being heated to about 120–125° C. to remove all water. There resulted a solid crystalline mixture composed of approximately 240.1 grams of potassium titanium fluoride and 233.8 grams of sodium chloride. Instead of evaporating the slurry to dryness it can be filtered, to recover the potassium titanium fluoride. In this event, the mother liquor may be frozen solid, and the solid frozen mass used in the next cycle instead of frozen water. This will decrease the amount of evaporation required.

*Example III*

190 grams of titanium tetrachloride was added to 570 grams of carbon tetrachloride and the solution was cooled to 0° C. This was slowly added to 1000 grams of finely divided ice. The mixture was stirred for one hour and permitted to settle. The two liquid layers were separated. 348.6 grams of potassium fluoride were added to the aqueous solution and the slurry was stirred for two hours. The slurry was filtered to recover potassium titanium fluoride. The wet cake was washed with water and dried at 120–125° C. to produce substantially pure potassium titanium fluoride. The mother liquor contained approximately 298.2 grams of potassium chloride, 1000 grams of water and some potassium titanium fluoride. The mother liquor was evaporated to recover additional potassium chloride and potassium fluotitanate contained therein.

*Example IV*

190 grams of titanium tetrachloride was added to 570 grams of carbon tetrachloride and the solution was cooled to 0° C. This was slowly added to 1080 grams of chopped ice. The mixture was stirred for one hour and permitted to settle. The two liquid layers were separated. 5 cc. of concentrated hydrochloric acid was added. 149.1 grams of potassium chloride and 252 grams of sodium fluoride were added and the resulting slurry stirred for two hours. It was then filtered at 25° C. and 224.8 grams of potassium titanium fluoride were recovered as the filter cake. This was a yield of 93.3% based on the theoretical yield. The mother liquor was evaporated and filtered at approximately 80° C. to yield sodium chloride, and then cooled to 25° C. to produce a further amount of potassium titanium fluoride. Instead of filtering, the slurry can be evaporated to dryness and heated to about 120–125° C. to give a solid crystalline mixture composed of approximately 240.1 grams of potassium titanium fluoride and 350 grams of sodium chloride, a composition useful in the preparation of a fused salt bath suitable for electrolytic recovery of titanium.

*Example V*

190 grams of titanium tetrachloride was added to 570 grams of carbon tetrachloride and the solution was cooled to between 0° C. and 5° C. This solution was slowly added to approximately 1100 grams of chopped ice. The slurry produced was stirred for two hours. The resulting solution was permitted to settle and the two liquid layers were separated. To the aqueous layer there was added 252 grams of sodium fluoride. The product was stirred for two hours and filtered at 25° C. Approximately 187 grams of sodium titanium fluoride were obtained. This is a yield of about 90%. Instead of filtering the slurry can be dried down to dryness and heated at 120–125° C. to give a solid crystalline mixture composed of 207.9 grams of sodium titanium fluoride and 233.8 grams of sodium chloride.

I claim:

1. A process for preparing an alkali metal fluotitanate which comprises: dissolving titanium tetrachloride in a chlorinated hydrocarbon which is insoluble in water; cooling the titanium tetrachloride solution to about 0° C.; adding the cooled titanium tetrachloride solution to a mass of finely divided ice at about 0° C. to form, as the ice melts, a cold aqueous solution of the tetrachloride with a minimum amount of water; permitting the mixture to separate into an aqueous phase and a non-aqueous phase; separating the two phases; adding an alkali metal fluoride to the aqueous phase, a cold aqueous solution of the tetrachloride, in the proportion of six mols of alkali metal fluoride to one mol of titanium tetrachloride, and recovering the alkali metal fluotitanate so formed from the resulting aqueous solution.

2. The process of claim 1 in which the chlorinated hydrocarbon is carbon tetrachloride.

3. The process of claim 2 in which the titanium tetrachloride is dissolved in about three times its weight of carbon tetrachloride.

4. The process of claim 1 in which the separated non-aqueous phase is returned to the process and additional titanium tetrachloride is dissolved therein.

5. A process for preparing potassium fluotitanate which comprises: dissolving titanium tetrachloride in a water-insoluble chlorinated hydrocarbon; cooling the titanium tetrachloride solution to about 0° C.; adding the cooled titanium tetrachloride solution to a mass of finely divided ice at about 0° C. to form, as the ice melts, a cold aqueous solution of the tetrachloride with a minimum amount of water and a non-aqueous phase; separating the aqueous solution from the non-aqueous phase; adding potassium fluoride to the cold aqueous solution of the tetrachloride in the proportion of six mols of fluoride to one mol of titanium tetrachloride, and recovering the potassium fluotitanate so formed from the resulting aqueous solution.

6. A process for preparing a mixture of an alkali metal chloride and an alkali metal fluotitanate which comprises: dissolving titanium tetrachloride in a water-insoluble chlorinated hydrocarbon; cooling the titanium tetrachloride solution to about 0° C.; adding the cooled titanium tetrachloride solution to a mass of finely divided ice at about 0° C. to form, as the ice melts, a cold aqueous solution of the tetrachloride with a minimum amount of water and a non-aqueous phase; separating the aqueous solution from the non-aqueous phase; adding an alkali metal chloride and an alkali metal fluoride to the cold aqueous solution of the tetrachloride in the proportion of six mols of alkali metal fluoride to one mol of titanium tetrachloride, and recovering the mixture of alkali metal chloride and alkali metal fluotitanate so formed from the resulting aqueous solution.

7. The process of claim 6 in which the alkali metal chloride and alkali metal fluoride added to the cold aqueous solution of titanium tetrachloride are in the form of a spent electrolyte produced by electrolyzing a fused mixture of an alkali metal chloride and an alkali metal fluotitanate to produce titanium metal, chlorine and spent electrolyte.

8. The process of claim 7 in which the alkali metal chloride is sodium chloride and the alkali metal fluoride is a fluoride selected from the group consisting of KF and NaF.

References Cited in the file of this patent

UNITED STATES PATENTS

| | | |
|---|---|---|
| 2,500,792 | Blythe et al. | Mar. 14, 1950 |
| 2,722,510 | Schaefer | Nov. 1, 1955 |
| 2,724,635 | Wainer | Nov. 22, 1955 |